Patented June 29, 1926.

1,590,644

UNITED STATES PATENT OFFICE.

CORNELIUS PICKSTONE, OF RADCLIFFE, ENGLAND.

INSULATING COMPOUND.

No Drawing. Application filed May 11, 1925, Serial No. 29,569, and in Great Britain July 31, 1924.

This invention has reference to a new composition, mixture, or compound of materials which is very useful as a substitute for porcelain, earthenware, ebonite, vulcanite or like insulating material employed for electrical work, but which composition can be applied to many other uses or purposes where a hard, smooth, strong and attractive looking material is required.

The composition consists of a mixture of slate powder, rubber, bitumen and colouring matter along with a vulcanizing material such as sulphur. The bitumen or the colouring matter may be omitted as commercial results are obtainable for various purposes with the omission of either the bitumen or the colouring matter.

The amount of rubber incorporated would vary with the degree of hardness or resilience desired in the composition.

In the carrying out of my invention I make use of proportions preferably by weight such as the following: slate powder 40 per cent to 70 per cent, rubber 15 per cent to 25 per cent, bitumen 2 per cent to 10 per cent, vulcanizing material and colouring matter 13 per cent to 25 per cent.

If the bitumen be omitted then I would use the rubber in proportions of 17 per cent to 35 per cent.

If colouring matter be omitted I may proportionately increase the other items.

In preparing the composition or mixture I utilize slate waste and this is ground to a very fine powder or dust and the rubber is also ground to a meal or powder and the rubber may be more or less pure rubber or a mixture of pure rubber and re-claimed rubber. The bitumen where such is used is also ground to a powder as is the colouring matter which may be carbon black, coloured oxides, or other colouring ingredient or ingredients using one, two or more colours.

The whole of the items are mixed together and heated either separately or following the mixing and the sulphur is added in known fashion. Following heating the mass is moulded and pressed and cured by steam heat or in other known fashion.

The time required for curing varies according to the desired result and whether the composition is to be hard or resilient.

It is to be understood I may omit the bitumen altogether, or the colouring matter altogether.

The colouring matter when introduced may be such as to colour the mixing throughout the mass or in patches or sections.

The results obtained have the appearance of finely surfaced ebonite or the like and when colour matter is used of finely coloured ebonite. The material is a good insulating one, uniform in texture, not easily broken and capable of taking a high polish. The colouring matter produces very artistic effects and when the colour is in sections amorphous designs or colour markings are obtained which render the material very attractive in appearance. The resulting composition can be buffed, polished or finished to have a "matt" surface.

If the colouring matter is considerable and the mixing effect thorough, a uniform colour or tint is given to the product. Several colours introduced locally may be made use of.

The product can be drilled and tapped and worked with machine tools, sawn, cut, surface ground and shaped with emery or carborundum wheels, and its uses for insulation and other purposes are innumerable. The composition can be used for utensils, vases, ornaments, lamp holders, pedestals, inlays, floor coverings and for the production of numerous articles and particularly when various colours are introduced.

I declare that what I claim is:—

1. An insulating composition comprising slate powder approximately 40 to 70 per cent, rubber from 15 to 25 per cent, pitch from 2 to 10 per cent, vulcanizing material including coloring matter from 13 to 25 per cent.

2. An insulating composition comprising finely powdered slate in the proportion of 40 to 70 per cent, powdered rubber from 15 to 25 per cent, powdered bitumen representing 2 to 10 per cent, and a mixture of powdered coloring matter and vulcanizing material representing from 13 to 25 per cent, the ingredients being heated, the vulcanizing material added and the result moulded, pressed, and cured by heat, all as set forth.

In testimony whereof I have signed my name to this specification.

CORNELIUS PICKSTONE.